Jan. 12, 1960  H. EISMANN ET AL  2,920,528
PHOTOGRAPHIC OBJECTIVE
Filed Feb. 16, 1959
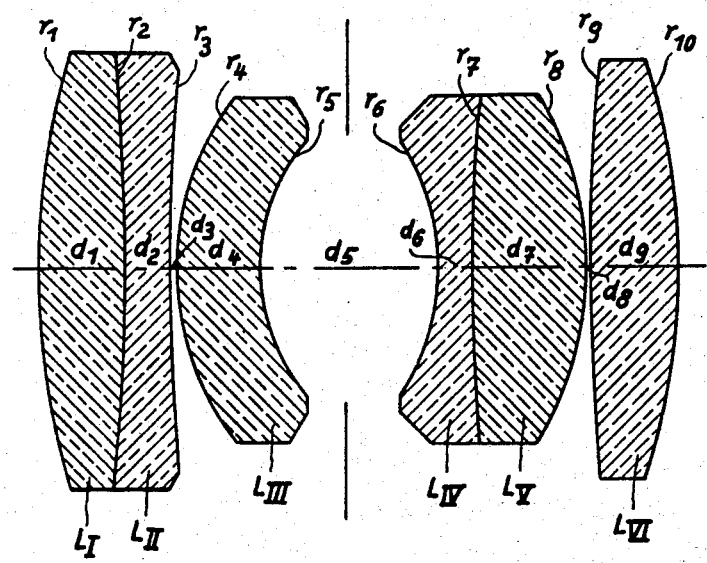

United States Patent Office 2,920,528
Patented Jan. 12, 1960

---

2,920,528

PHOTOGRAPHIC OBJECTIVE

Helmut Eismann, Heidenheim (Brenz), and Günther Lange, Konigsbronn, Germany, assignors to Carl Zeiss, Heidenheim (Brenz), Wurttemberg, Germany Application February 16, 1959, Serial No. 793,634

Claims priority, application Germany February 20, 1958

2 Claims. (Cl. 88—57)

The invention concerns high-aperture photographic objectives consisting of four members more particularly of two inner meniscus-shaped dispersive members which turn their concave sides towards each other and enclose the diaphragm, and of two external collective members wherein the second and the fourth members are uncemented single lenses while the first and the third members are meniscus-shaped compound members which consist each of two lenses of opposed refractive power cemented together wherein the dispersive lens is in each case turned towards the diaphragm. (Cf. Brit. pat. spec. 480,643), U.S.A. Pat. Spec. 2,748,656.)

Basis of the invention is the task to create objectives of the aforesaid design in which the focal intercept amounts to at least 70% of the focal length.

The objectives according to the invention have a focal intercept of the aforesaid kind and show the following characteristics:

$$0.62 \cdot f < r_4 + |r_8| < 1.00 \cdot f$$
$$0.45 \cdot f < r_5 + |r_6| < 0.75 \cdot f$$
$$0.42 \cdot f < d_4 + d_5 + d_6 + d_7 < 0.65 \cdot f$$
$$0.15 \cdot f < d_5 < 0.30 \cdot f$$

$$1.65 < \frac{n_{III} + n_V}{2} < n_{IV}$$

$$2.0 < \frac{r_3}{r_1} < 10.0$$

Herein as well as in the two appended Tables I and II in which numerical values for two embodiments of objectives according to the invention are given there are designed by L—the lenses,
r—the radii,
d—the apical separations,
n—the refractive indices,
ν—the Abbe numbers,
Δ n/r—the individual surface refractive powers,
s'—the focal intercept, and
f—the focal length.

In the appended figure of the illustration a schematic representation of the lens design of the said objectives is given.

The tabular values given refer to a focal length of $f=1.00$. The aperture ratio in both embodiments of the objective is 1:2.

Table I

| Lenses | Radii | Apical Separations | n | ν |
|---|---|---|---|---|
| $L_I$ | $r_1=+0.99395$ | $d_1=0.11615$ | 1.71300 | 53.89 |
| $L_{II}$ | $r_2=-3.09812$ | $d_2=0.06050$ | 1.59551 | 39.20 |
|  | $r_3=+3.28173$ | $d_3=0.00302$ |  |  |
| $L_{III}$ | $r_4=+0.35520$ | $d_4=0.11270$ | 1.67270 | 32.23 |
|  | $r_5=+0.26256$ | $d_5=0.23763$ |  |  |
| $L_{IV}$ | $r_6=-0.30759$ | $d_6=0.04840$ | 1.78470 | 26.10 |
|  | $r_7=+4.25209$ | $d_7=0.14779$ | 1.74400 | 44.90 |
| $L_V$ | $r_8=-0.41018$ | $d_8=0.00302$ |  |  |
|  | $r_9=+3.40194$ | $d_9=0.11494$ | 1.74400 | 44.90 |
| $L_{VI}$ | $r_{10}=-0.88584$ | $s'=0.8022$ |  |  |

$L_I \ldots L_{VI}$ being the lenses;
$r_1 \ldots r_{10}$ being the radii;
$d_1 \ldots d_9$ being the thicknesses and air separation of the lenses;
$n_I \ldots n_{VI}$ being the refractive indices;
$\nu_I \ldots \nu_{VI}$ being the Abbe-$\nu$-numbers;
$s'$ being the back focal length; and
$f$ being the focal length of the objective.

Table II

| Lenses | Radii | Apical Separations | n | ν |
|---|---|---|---|---|
| $L_I$ | $r_1=+0.92627$ | $d_1=0.11632$ | 1.71300 | 53.89 |
| $L_{II}$ | $r_2=-3.05836$ | $d_2=0.06058$ | 1.59551 | 39.20 |
|  | $r_3=+4.13749$ | $d_3=0.00303$ |  |  |
| $L_{III}$ | $r_4=+0.37141$ | $d_4=0.11268$ | 1.66892 | 44.98 |
|  | $r_5=-0.27852$ | $d_5=0.18781$ |  |  |
| $L_{IV}$ | $r_6=-0.31704$ | $d_6=0.04847$ | 1.78470 | 26.10 |
|  | $r_7=+4.25829$ | $d_7=0.13328$ | 1.74400 | 44.90 |
| $L_V$ | $r_8=-0.41674$ | $d_8=0.00303$ |  |  |
|  | $r_9=+3.76799$ | $d_9=0.09693$ | 1.73520 | 41.00 |
| $L_{VI}$ | $r_{10}=-0.93294$ | $s'=0.7585$ |  |  |

$L_I \ldots L_{VI}$ being the lenses;
$r_1 \ldots r_{10}$ being the radii;
$d_1 \ldots d_9$ being the thicknesses and air separation of the lenses;
$n_I \ldots n_{VI}$ being the refractive indices;
$\nu_I \ldots \nu_{VI}$ being the Abbe-$\nu$-numbers;
$s'$ being the back focal length; and
$f$ being the focal length of the objective.

We claim:

1. A high-aperture photographic objective consisting of four members more particularly of two inner meniscus-shaped dispersive members which turn their concave sides towards each other and enclose the diaphragm and of two outer collective members wherein the second and the fourth members are uncemented single lenses while the first and the third members are meniscus-shaped compound members which consist each of two lenses of opposed refractive powers cemented together wherein the dispersive lens is in each case turned towards the diaphragm characterized in that the following characteristics are simultaneously satisfied:

$$0.62 \cdot f < r_4 + |r_8| < 1.00 \cdot f$$
$$0.45 \cdot f < r_5 + |r_6| < 0.75 \cdot f$$
$$0.42 \cdot f < d_4 + d_5 + d_6 + d_7 < 0.65 \cdot f$$
$$0.15 \cdot f < d_5 < 0.30 \cdot f$$
$$1.65 < \frac{n_{III} + n_V}{2} < n_{IV}$$
$$2.0 < \frac{r_3}{r_1} < 10.0$$

and in that its constructional data coincide with the values taken from the appended table in so far that every surface refractive power ($\Delta n/r$) lies within a range of $\pm 0.35/f$ and every apical separation ($d$) lies within a range of $\pm 0.07 \cdot f$ on either side of the corresponding value indicated in the appended table.

| Lenses | Radii | Apical Separations | $n$ | $\nu$ | $\Delta n/r$ |
|---|---|---|---|---|---|
| $L_I$ | $r_1 = +0.99395 \cdot f$ | | 1.71300 | 53.89 | $+0.717340/f$ |
| | | $d_1 = 0.11615 \cdot f$ | | | $+0.037923/f$ |
| | $r_2 = -3.09812 \cdot f$ | | | | |
| $L_{II}$ | | $d_2 = 0.06050 \cdot f$ | 1.59551 | 39.20 | $-0.181462/f$ |
| | $r_3 = +3.28173 \cdot f$ | | | | |
| | | $d_3 = 0.00302 \cdot f$ | | | $+1.893847/f$ |
| | $r_4 = +0.35520 \cdot f$ | | | | |
| $L_{III}$ | | $d_4 = 0.11270 \cdot f$ | 1.67270 | 32.23 | $-2.562091/f$ |
| | $r_5 = +0.26256 \cdot f$ | | | | |
| | | $d_5 = 0.23763 \cdot f$ | | | $-2.551107/f$ |
| | $r_6 = -0.30759 \cdot f$ | | | | |
| $L_{IV}$ | | $d_6 = 0.04840 \cdot f$ | 1.78470 | 26.10 | $-0.009572/f$ |
| | $r_7 = +4.25209 \cdot f$ | | | | |
| | | $d_7 = 0.14779 \cdot f$ | 1.74400 | 44.90 | $+1.813829/f$ |
| $L_V$ | $r_8 = -0.41018 \cdot f$ | | | | |
| | | $d_8 = 0.00302 \cdot f$ | | | $+0.218699/f$ |
| | $r_9 = +3.40194 \cdot f$ | | | | |
| $L_{VI}$ | | $d_9 = 0.11494 \cdot f$ | 1.74400 | 44.90 | $+0.839877/f$ |
| | $r_{10} = -0.88584 \cdot f$ | | | | |
| | | $s' = 0.8022 \cdot f$ | | | |

$L_I \ldots L_{VI}$ being the lenses;
$r_1 \ldots r_{10}$ being the radii;
$d_1 \ldots d_9$ being the thicknesses and air separation of the lenses;
$n_I \ldots n_{VI}$ being the refractive indices;
$\nu_I \ldots \nu_{VI}$ being the Abbe-$\nu$-numbers;
$s'$ being the back focal length; and
$f$ being the focal length of the objective.

2. A high-aperture photographic objective consisting of four members more particularly of two inner meniscus-shaped dispersive members which turn their concave sides towards each other and enclose the diaphragm and of two outer collective members wherein the second and the fourth members are uncemented single lenses while the first and the third members are meniscus-shaped compound members which consist each of two lenses of opposed refractive powers cemented together wherein the dispersive lens is in each case turned towards the diaphragm characterized in that the following characteristics are simultaneously satisfied:

$$0.62 \cdot f < r_4 + |r_8| < 1.00 \cdot f$$
$$0.45 \cdot f < r_5 + |r_6| < 0.75 \cdot f$$
$$0.42 \cdot f < d_4 + d_5 + d_6 + d_7 < 0.65 \cdot f$$
$$0.15 \cdot f < d_5 < 0.30 \cdot f$$
$$1.65 < \frac{n_{III} + n_V}{2} < n_{IV}$$
$$2.0 < \frac{r_3}{r_1} < 10.0$$

and in that its constructional data coincide with the values taken from the appended table in so far that every surface refractive power ($\Delta n/r$) lies within a range of $\pm 0.35/f$ and every apical separation ($d$) lies within a range of $\pm 0.07 \cdot f$ on either side of the corresponding value indicated in the appended table.

| Lenses | Radii | Apical Separations | $n$ | $\nu$ | $\Delta n/r$ |
|---|---|---|---|---|---|
| $L_I$ | $r_1 = +0.92627 \cdot f$ | | 1.71300 | 53.89 | $+0.769754/f$ |
| | | $d_1 = 0.11632 \cdot f$ | | | $+0.038416/f$ |
| | $r_2 = -3.05836 \cdot f$ | | | | |
| $L_{II}$ | | $d_2 = 0.06058 \cdot f$ | 1.59551 | 39.20 | $-0.143930/f$ |
| | $r_3 = +4.13749 \cdot f$ | | | | |
| | | $d_3 = 0.00303 \cdot f$ | | | $+1.801028/f$ |
| | $r_4 = +0.37141 \cdot f$ | | | | |
| $L_{III}$ | | $d_4 = 0.11268 \cdot f$ | 1.66892 | 44.98 | $-2.401695/f$ |
| | $r_5 = -0.27852 \cdot f$ | | | | |
| | | $d_5 = 0.18781 \cdot f$ | | | $-2.475082/f$ |
| | $r_6 = -0.31704 \cdot f$ | | | | |
| $L_{IV}$ | | $d_6 = 0.04847 \cdot f$ | 1.78470 | 26.10 | $-0.009558/f$ |
| | $r_7 = +4.25829 \cdot f$ | | | | |
| | | $d_7 = 0.13328 \cdot f$ | 1.74400 | 44.90 | $+1.785286/f$ |
| $L_V$ | $r_8 = -0.41674 \cdot f$ | | | | |
| | | $d_8 = 0.00303 \cdot f$ | | | $+0.195117/f$ |
| | $r_9 = +3.76799 \cdot f$ | | | | |
| $L_{VI}$ | | $d_9 = 0.09693 \cdot f$ | 1.73520 | 41.00 | $+0.788046/f$ |
| | $r_{10} = -0.93294 \cdot f$ | | | | |
| | | $s' = 0.7585 \cdot f$ | | | |

$L_I \ldots L_{VI}$ being the lenses;
$r_1 \ldots r_{10}$ being the radii;
$d_1 \ldots d_9$ being the thicknesses and air separation of the lenses;
$n_I \ldots n_{VI}$ being the refractive indices;
$\nu_I \ldots \nu_{VI}$ being the Abbe-$\nu$-numbers;
$s'$ being the back focal length; and
$f$ being the focal length of the objective.

References Cited in the file of this patent

UNITED STATES PATENTS

| | | |
|---|---|---|
| 2,171,640 | Berek | Sept. 5, 1939 |
| 2,649,023 | Tronnier | Aug. 18, 1953 |
| 2,748,656 | Berger et al. | June 5, 1956 |